(12) United States Patent
Poulos et al.

(10) Patent No.: US 9,586,309 B1
(45) Date of Patent: Mar. 7, 2017

(54) STABILIZING DOOR/OBJECT HOLDING STAND

(71) Applicants: Peter Poulos, Aiken, SC (US); Lynne Poulos, Aiken, SC (US); Bereket Kiflu, Aiken, SC (US); Saba Kiflu, Aiken, SC (US)

(72) Inventors: Peter Poulos, Aiken, SC (US); Lynne Poulos, Aiken, SC (US); Bereket Kiflu, Aiken, SC (US); Saba Kiflu, Aiken, SC (US)

( * ) Notice: Subject to any disclaimer, the term of this patent is extended or adjusted under 35 U.S.C. 154(b) by 0 days.

(21) Appl. No.: 15/136,898

(22) Filed: Apr. 23, 2016

(51) Int. Cl.
  *B25B 5/14* (2006.01)
  *B25B 1/20* (2006.01)
  *F16M 11/04* (2006.01)
  *F16M 13/02* (2006.01)
  *B25B 1/24* (2006.01)
  *E04F 21/00* (2006.01)

(52) U.S. Cl.
  CPC .............. *B25B 1/20* (2013.01); *B25B 1/241* (2013.01); *E04F 21/0007* (2013.01); *E04F 21/0023* (2013.01); *F16M 11/041* (2013.01); *F16M 13/02* (2013.01)

(58) Field of Classification Search
  None
  See application file for complete search history.

(56) References Cited

U.S. PATENT DOCUMENTS

| 2,754,708 | A | * | 7/1956 | Peterson | ............... B25B 1/2421 269/224 |
| 5,906,365 | A | * | 5/1999 | Wu | .......................... B23C 3/355 269/319 |
| 6,953,188 | B2 | * | 10/2005 | Siegel | ....................... B25B 1/08 269/254 CS |
| 2006/0108729 | A1 | * | 5/2006 | Siegel | ....................... B25B 1/08 269/266 |

* cited by examiner

*Primary Examiner* — Lee D Wilson
(74) *Attorney, Agent, or Firm* — Melissa B. Neely

(57) ABSTRACT

A device for holding a door in a stable position while the hinges which affix the door to the door frame are either replaced or initially installed. The basic features of the device consist of a base to which two side panels are affixed opposite each other. One of the sides is equipped with one or more clamping mechanism with the other side equipped with cushioning pads aligned opposite of the clamping mechanism. Stabilizing rotatable outriggers are attached to each side panel to assist in the restriction of movement of the device relative to the floor. The device may be used in either a vertical or horizontal position depending upon the clearance between the door and the floor.

2 Claims, 4 Drawing Sheets ary of the inventio

STABILIZING DOOR/OBJECT HOLDING STAND

CROSS REFERENCE TO RELATED APPLICATIONS

Not Applicable

STATEMENT REGARDING FEDERALLY SPONSORED RESEARCH OR DEVELOPMENT

This invention was not made by an agency of the United States Government nor under a contract with an agency of the United States Government.

PARTIES TO JOINT RESEARCH AGREEMENT

Not Applicable.

REFERENCE TO SEQUENCE LISTING

Not Applicable.

FIELD OF THE INVENTION

The present invention is directed to a device for holding a door or other object in place while installation or maintenance work is being employed. The main use of the invention is for holding a door in place while the door hinges are either attached or replaced, however the invention can be utilized for holding other objects in a secure position while work is being performed.

BACKGROUND OF THE INVENTION

Residential doors are generally affixed to their door frame by means of two or more hinges.

Often one or more of these hinges require replacement, providing the repairer with the conundrum of how to maintain the door in position while the hinges are removed and replaced. The device described in this application pertains to stabilizing the door for the replacement of existing hinges or the application of new hinges that connect the door to the door frame. It should be noted that although the above is considered the main purpose of the invention, the usage of the invention is not limited to use with doors and can be used to stabilize other objects in an upright position.

BRIEF SUMMARY OF THE INVENTION

The device was primarily designed to hold a door in a stable position while the hinges which affix the door to the door frame are either replaced or initially installed. The basic features of the device consist of a base to which two immovable side panels are affixed opposite each other and perpendicular to the base (as seen in FIGS. 1 and 3). One of the sides is equipped with one or more clamping mechanism with the other side equipped with cushioning pads aligned opposite of the clamping mechanism. The portion of the clamping mechanism that makes contact with the door is also equipped with cushioning pads. The aforementioned clamping mechanism is utilized to secure the door in the device while the cushioning pads are intended to prevent cosmetic damage to the door surface.

Each of the two sides are also equipped with a stabilizing outrigger. The outriggers are attached to the sides using spring loaded hinge mechanism such that when the door holder is in place stabilizing a door, the outrigger is pivoted into its downward position so that the outriggers end is in contact with the floor thus increasing the ability of the holder to maintain the door in a fixed position relative to the door frame.

The base of the device is tapered along its length (the portion of the base between the two open ends) such that the base is thickest at one end and thinnest at the opposite end. This tapering is utilized to assist in positioning the device under the bottom edge of door that is already hung in a door frame. The tapering effectively acts as a shim. The end of the base which is considered the thickest is equipped with a notched void space that is used when the device is used in its vertical position as explained below.

The device is designed to be utilized in either a horizontal or vertical position. In the horizontal position the base of the device is in contact with the floor in a parallel position such that the largest surface area of the base piece is in contact with the floor. In the vertical position, the base of the device is positioned such that the largest surface area of the base is not in contact with the floor, but would rather be considered to be perpendicular to the floor. The end of the base with the notched void is the preferred end to be in contact with the floor when the device is used in its vertical position. The notched void is designed to allow wooded shims to be inserted under the door to enable leveling and stabilizing the door. The vertical utilization of the device is intended for using with hung doors which have very low clearance with the floor.

DETAILED DESCRIPTION OF THE INVENTION

Figure 1:
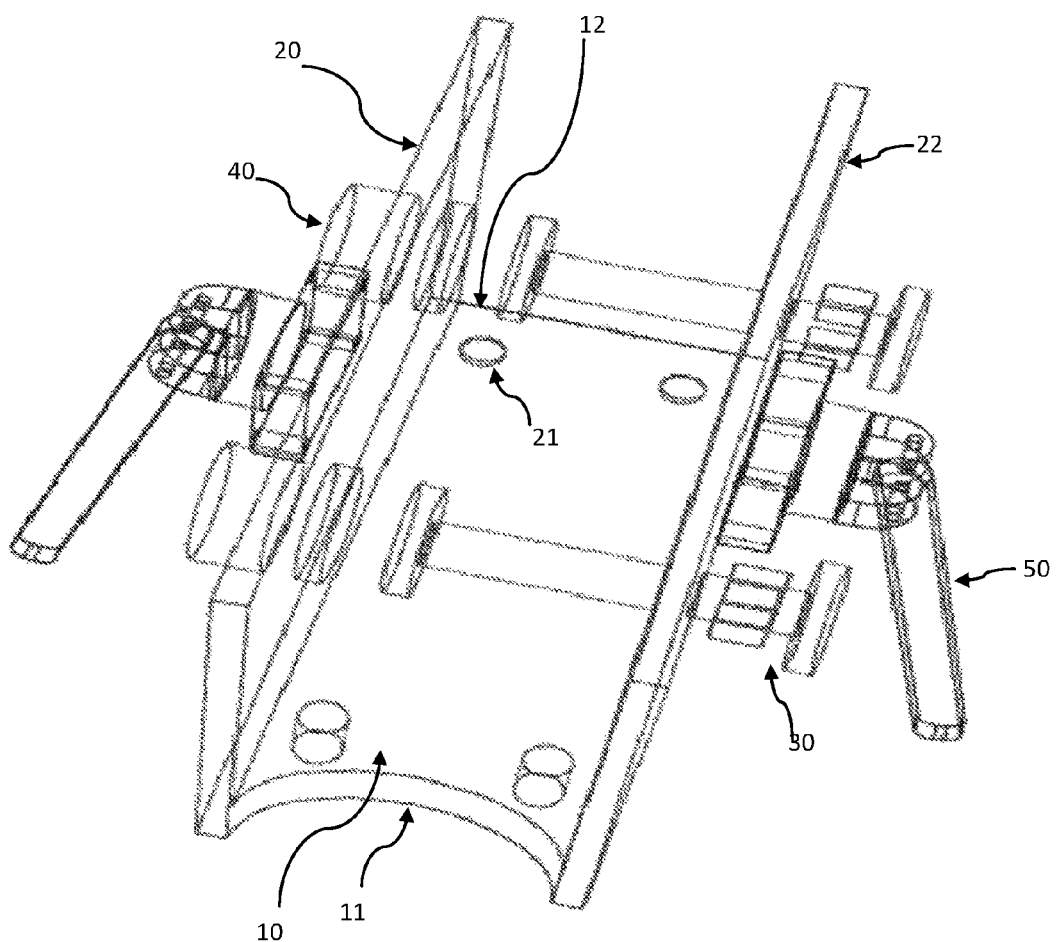
FIG. 1 is a top angled view of the device showing the base (10), the notched end (11), the two sides (20), mounting holes for table top vise (21), rubberized edges (22), the clamping mechanism (30), the cushioning pads (40) and the rotating stabilizing outrigger assembly (50).

The present invention is directed to a device for stabilizing a door for the application of or replacement of hinges used for affixing the door to a door frame. Although this is the main purpose of the present invention, it should be noted that the device may be used in other applications such as a table top vise grip.

The invention is capable of being utilized in two positions with regard to the orientation of the invention to floor. In the horizontal position, the device is placed such that the largest surface area of the base (10) is in contact with the floor. In the vertical position, the invention is oriented such that the base section (10) is perpendicular to the floor and is in contact with the floor on the side opposite to section (12) of the base. The invention will be described with regard to its horizontal orientation below with the variation of usage in the vertical position to follow.

The device consists of a base (10) to which are affixed two sides (20) opposite one another. The base (10) is rectangular in shape with a notched void (11) at one end of the base (10). The base (10) is tapered in thickness from the high point at the notched end (11) to its lowest point at the opposite end (12). The base (10) is tapered to ease its positioning under a standing door to hold the door stable while the door's hinges are replaced. The tapered base (10) also acts as a shim to further stabilize the door during hinge replacement and allows the usage of additional shims to aid in stabilization of the door.

The tapered base (10) is also equipped with four holes (21) located at each corner of the tapered base (10). These holes are utilized for using the device as a table top vise. When the device is being used as a table top vise, the rotating stabilizing outrigger assembly (50) can be removed.

In a typical embodiment of the invention the base (10) measures approximately 24 centimeters (cm) in length (L1) and 11 cm in width (W1). The thickness of the base decreases along its length with the high point of approximately 15 millimeters (mm) at the notched end (11) to approximately 8 mm at the opposite end (12). The side panels (20) are also rectangular in shape. A typical side (20) measures approximately 24 cm in length (L2) and 16 cm in width (W2) and has a thickness of approximately 17 mm.

It should be noted that the dimensions described above are for a typical embodiment of the invention and are provided to give a perspective of the relative size of the invention in comparison to a standard door. The invention is not limited to the dimensions of the typical embodiment described above.

The portions of the device that may come into contact with the floor when the device is used in either its horizontal or vertical position are coated with a rubberized material. This includes the end (22), the sides (20) and the bottom of the base section (10). The coating material is necessary to inhibit the stand from sliding on the floor and to prevent scratching or other cosmetic damage to the floor.

One of the side wall panels (20) is equipped with one or more clamping mechanisms (30) for stabilizing a door which has been positioned in the holder. In the preferred embodiment of the device, two screw clamp type clamps (30) are utilized. The end of the screw clamp which makes contact with the door surface is equipped with a cushioning pad (31). The opposite side panel (20) is equipped with one or more additional cushioning pads (40), at least one of which is aligned with each clamping mechanism (30). The purpose of the cushioning pads (31, 40) is to prevent cosmetic damage to wall and door surfaces.

It should be noted that although the clamping mechanism (30) is shown in the embodiment represented in the drawings accompanying this application is a screw type clamp, the invention is envisioned to utilize other types of clamping mechanisms such as a flip down type of clamp.

The two sides (20) are equipped with one or more stabilizing outrigger assemblies (50). The outrigger arm (51) is similar to a door stop. One end of the outrigger arm (51) is attached to the swivel/rotation mechanism (52) via a hinge which allows the outrigger arms (51) to rotate up or down. The outrigger arms (51) provide tension or compression when in contact with the floor. This is accomplished through spring loaded outrigger arms (51). Other means such as rigid/fixed outrigger arms can be used to stabilize the door. When the door stand is holding a door, the free end of the outrigger arm (51) makes contact with the floor. A friction pad is mounted on the end of the outrigger arm contacting the floor to prevent movement of the outrigger arm (51) along the floor. When the door is in the stand, the outrigger arms (51) minimize rotation about its horizontal axis.

As noted above the invention is not limited to usage in the described horizontal position. The invention may also be used in a vertical position when stabilizing a door which has low clearance relative to the floor.

Figure 2:
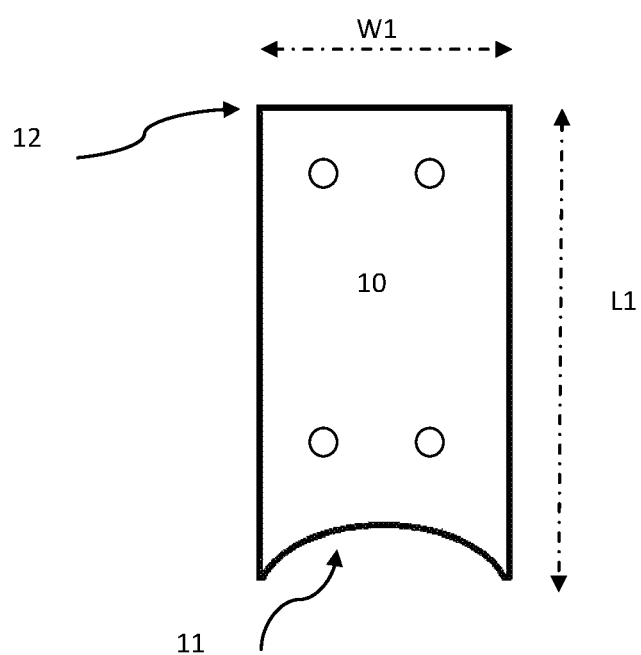
FIG. 2 shows a top view of the base (10).
Figure 3:
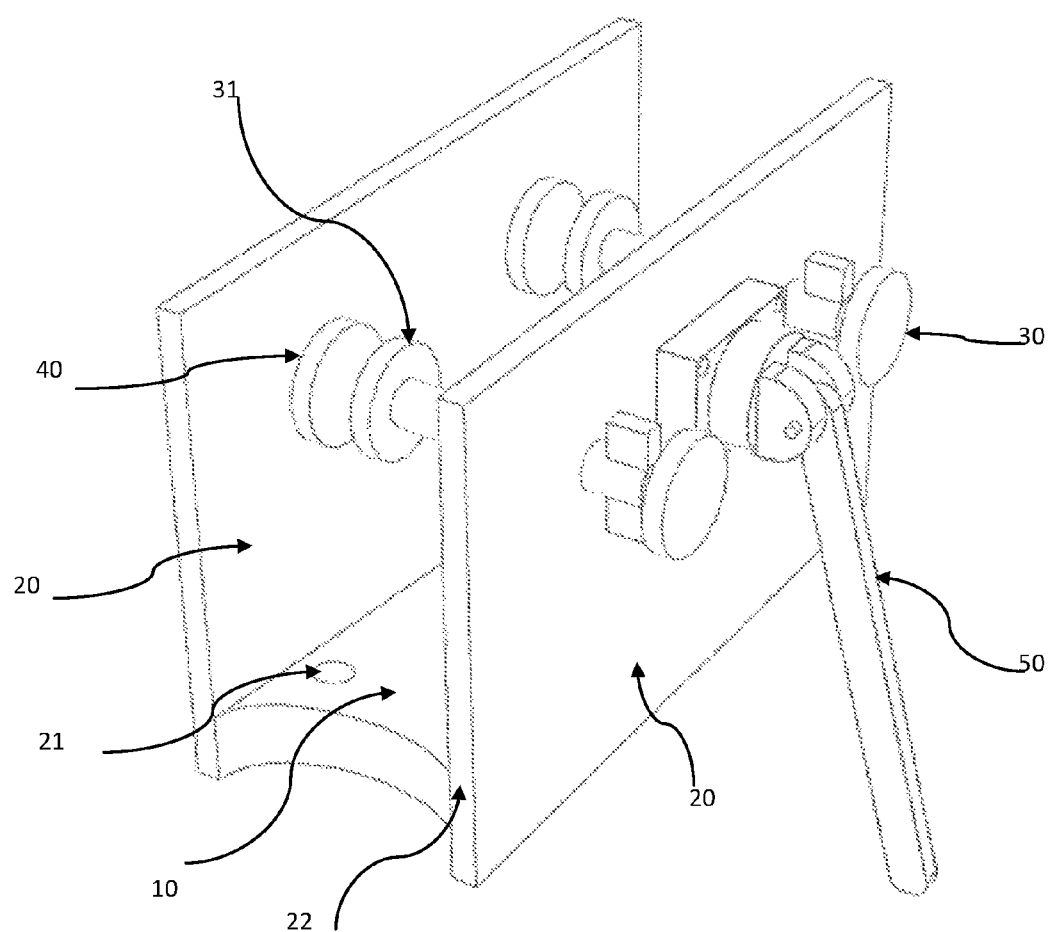
FIG. 3 is a side view of the device showing the base (10), the two sides (20), mounting holes for a table top vise (21), rubberized edges (22), the clamping mechanism (30), the cushioning pads (31, 40) and the rotating stabilizing outrigger assembly (50).
Figure 4:
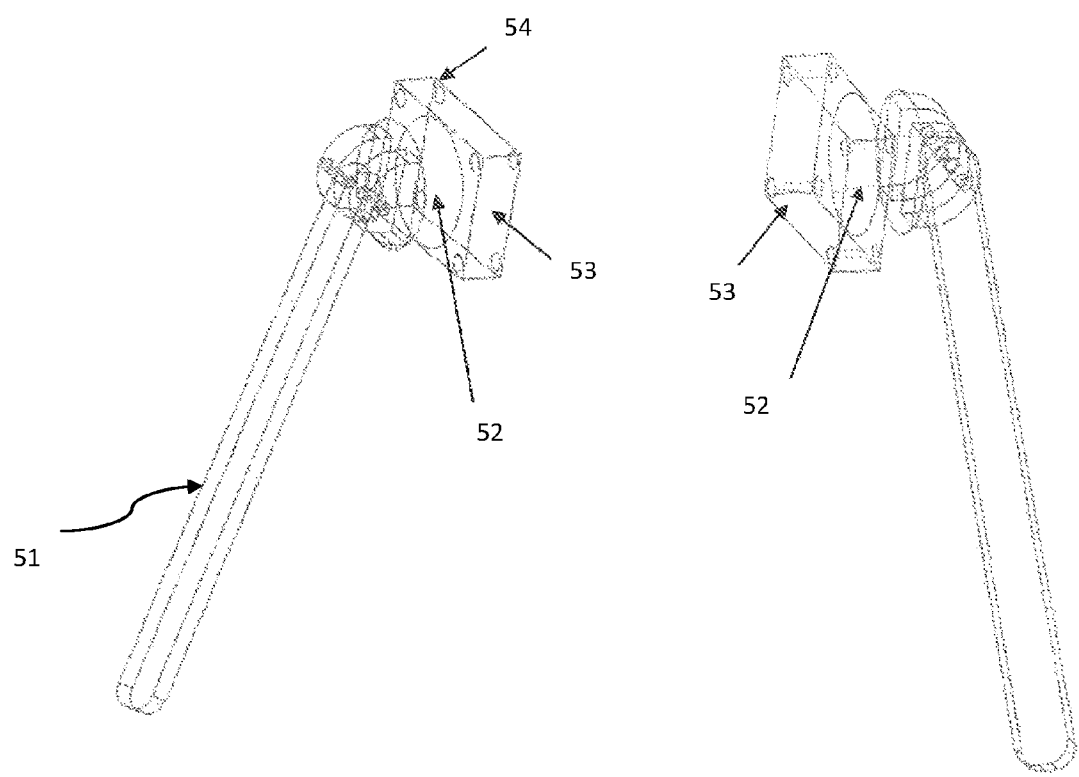
FIG. 4 is a view of the stabilizing outriggers (50) showing the outrigger arm (51), the swivel/rotation mechanism (52), the swivel/rotation mechanism base (53) and the screw holes (54) that are used for attaching the stabilizing outrigger assembly base (53) to the sides (20) of the device.

In the vertical position, the base section (10) is oriented perpendicular to the floor with the notched end (11) in the lower position (closest to the floor) and the non-notched end (12) in the higher position (see FIG. 2). The notched end (11) is configured as such to allow leveling shims to be inserted under the bottom corner of the door to aid in leveling and stabilizing the door.

The clamping function performs in the vertical orientation of the holder in the same manner as it did with the holder in the horizontal position.

The stabilizing outriggers (50) are utilized to prevent tipping of the device when positioning the door in the device and to aid in maintaining the device in position on the floor while work is being done on the door being held in the device. The outrigger (50) is attached to the side panels (20) of the device with screws, this allows for the user of the device to remove the outriggers (50) if desired.

The outrigger is designed to be used with the device in either its horizontal or vertical orientation. The swivel/rotation mechanism (52) rotates 90 degrees to allow the outrigger arms (51) to deployed in either orientation and locked into position while the device is in use. The stabilizing outriggers (51) are positioned on the side panels (20) such that the outriggers (50) do not interfere with the operation of the clamping mechanism (30).

Review of the prior art provides several patents that are related to the positioning and stabilizing of a door in preparation for securing the door to the door frame. The present invention is perceived as an improvement upon these prior patents as described below.

Several of the prior art patents are for inventions that relate to the movement of the door into position for handing the door within the door frame. These include U.S. Pat. No. 4,050,671 (Coleman), U.S. Pat. No. 7,410,180 (Nguyen), U.S. Pat. No. 7,784,802 (White), U.S. Pat. No. 8,002,510 (Williams) and U.S. Pat. No. 8,662,486 (Holder). The present invention differs from the devices covered in the aforementioned patents in a number of ways. These devices are intended for the movement of doors some distance and the positioning of the doors within the door frames. The inventions utilize rollers or wheels for the movement of the door and said rollers or wheels would inhibit the stabilization of the door while the hinge installation is in process. These inventions are also much larger that the relatively compact size of the present invention.

The prior art also includes inventions that are designed for the positioning of doors for hanging in door frames. These include U.S. Pat. No. 4,391,437 (Collins), U.S. Pat. No. 7,125,009 (McCann) and U.S. Pat. No. 8,398,062 (Condit). Unlike these inventions, the invention covered by this application may be used with doors already in place for the replacement of the hinges where the doors have very low clearance with the floor. The Collins, McCann and Condit inventions by their design require the door to have a certain clearance relative to the floor as dictated by the dimensions of the apparatus section which is placed under the door.

Although prototypes of the inventions include the sides (20) and base (10) constructed of wood, it is envisioned that the device may be constructed of various organic and inorganic polymers that comprise a material that is rigid and yet strong. The cushioning pads may be constructed of any organic or inorganic polymer capable of providing an enduring yet smooth surface such as to prevent cosmetic damage to the door when the clamping mechanisms are engaged.

A potential modification to the device would be the incorporation of a suction base on the bottom of the base section (10) replacing the rubberized coating. The use of a suction material would improve the stabilizing of the device relative to the floor especially when positioning the device on a ceramic, vinyl or wood floor.

A potential patent classification for this invention is Class 269 Work Holders; Sub-Class 329 Miscellaneous.

The present invention described above and illustrated in FIGS. 1 through 4 is visualized as the preferred embodiment of the invention. It is envisioned that this invention may be embodied in many different forms and should not be construed as limited to the embodiments set forth herein. It will be understood by those skilled in the art that changes in forms and details may be made without departing from the spirit and scope of the present application. It is therefore intended that the present invention not be limited to the exact forms and details described and illustrated herein, but falls within the scope of the appended claims.

The terminology used herein is for the purpose of describing particular embodiments only and is not intended to be limiting of the invention. As used herein, the singular forms "a", an and the are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the specification and relevant art and should not be interpreted in an idealized or overly formal sense unless expressly so defined herein. Well-known functions or constructions may not be described in detail for brevity and/or clarity.

It will be understood that when an element is referred to as being on, "attached" to, "connected" to, "coupled" with, "contacting", etc., another element, it can be directly on, attached to, connected to, coupled with or contacting the other element or intervening elements may also be present. In contrast, when an element is referred to as being, for example, "directly on", "directly attached" to, "directly connected" to, "directly coupled" with or "directly contacting" another element, there are no intervening elements present. It will also be appreciated by those of skill in the art that references to a stricture or feature that is disposed "adjacent" another feature may have portions that overlap or underlie the adjacent feature.

The invention claimed is:

1. A device for holding and stabilizing a door for maintenance and hinge replacement, said device comprising
    a solid base tapered from the thinnest section at one end of the base to the thickest section at the opposite end of the base thereby allowing the base to function as a shim and enabling the base to be slid under a door and further allow for the positioning of shims between the bottom of the door and the base to aid in stabilization of the door and where the bottom of said base is coated with a non-skid rubberized material;
    two immovable side panels affixed to the longest edges of said solid base such that said side panels are perpendicular to said base panel and with said side panels positioned opposite one another;
    one or more screw type clamping mechanisms with cushioning pads on the contact end of the mechanism with the mechanisms affixed to one of two said side panels;
    cushioning pads affixed to the side panel opposite of the said clamping mechanisms;
    and detachable rotating stabilizing arms affixed to the outer side of each of the said side panels.

2. The device as recited in claim 1 where the exposed edges of said side panels are coated with a non-skid rubberized material and where said base section has a notch cut out at one end to allow for the placement of shims when said device is rotated 90 degrees to a vertical position and utilized to stabilize a door without positioning said device under the door.

* * * * *